United States Patent [19]
Hunter et al.

[11] Patent Number: 5,398,980
[45] Date of Patent: Mar. 21, 1995

[54] MECHANICAL PIPE JOINT

[75] Inventors: Thomas D. Hunter; Olin I. Jackson, both of Tyler; Minor W. Pannell, Flint, all of Tex.

[73] Assignee: Tyler Pipe Industries, Inc., Tyler, Tex.

[21] Appl. No.: 152,237

[22] Filed: Nov. 16, 1993

[51] Int. Cl.6 .................................. F16L 23/02
[52] U.S. Cl. ........................ 285/337; 285/342; 285/382.7; 285/414; 285/374
[58] Field of Search ............ 285/414, 403, 337, 342, 285/343, 374, 341, 382.7

[56] References Cited

U.S. PATENT DOCUMENTS

| | | | |
|---|---|---|---|
| 3,722,925 | 3/1973 | Robbins | 285/341 |
| 3,888,522 | 6/1975 | Moreiras | 285/382.7 |
| 3,937,500 | 2/1976 | Sato | 285/414 |
| 3,986,730 | 10/1976 | Martelli et al. | 285/342 |
| 4,092,036 | 5/1978 | Sato et al. | |
| 4,417,754 | 11/1983 | Yamaji et al. | 285/337 |
| 4,647,083 | 3/1987 | Hashimoto | 285/403 |
| 4,664,426 | 5/1987 | Ueki | 285/343 |
| 4,848,802 | 7/1989 | Wolf et al. | 285/382.7 |
| 4,848,808 | 7/1989 | Pannell et al. | 285/337 |
| 4,867,488 | 9/1989 | Jones | 285/337 |
| 4,878,698 | 11/1989 | Gilchrist | 285/342 |
| 4,896,903 | 1/1990 | Shumard | 285/337 |
| 4,984,308 | 1/1991 | Handel | 285/337 |
| 5,335,946 | 8/1994 | Dent et al. | |

FOREIGN PATENT DOCUMENTS 2069084  8/1981  United Kingdom ................ 285/414

*Primary Examiner*—Eric K. Nicholson
*Attorney, Agent, or Firm*—Michael A. O'Neil

[57] ABSTRACT

An improved mechanical pipe joint for use in a bell and plain pipe end assembly. The joint includes a gland having a conical cavity for receiving a toothed split ring that coaxially compresses and grips the plain pipe end as the gland is tightened to the bell. The joint is sealed by a compressible gasket positioned between the split ring and the bell. The gland further includes an integrally formed, radially extending shelf for abutting against the split ring and mechanically stopping the gland from being pulled over the split ring during joint assembly.

2 Claims, 2 Drawing Sheets

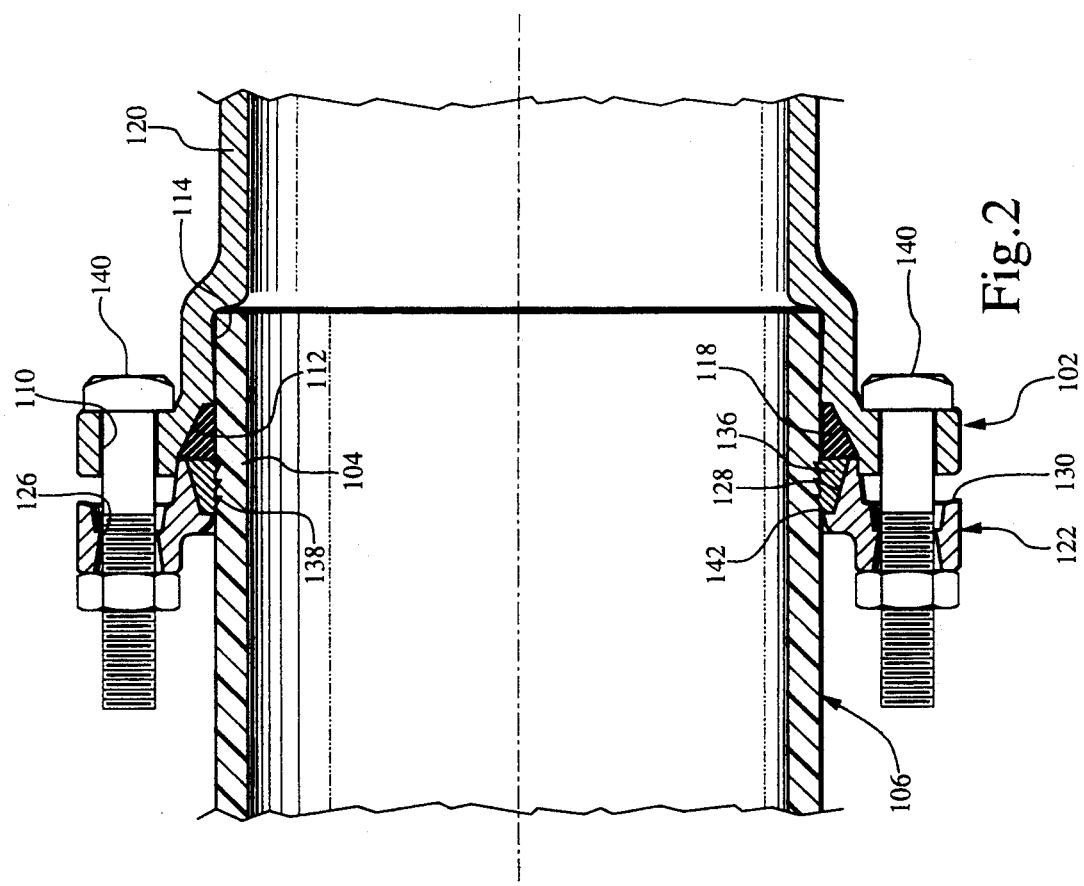

MECHANICAL PIPE JOINT

TECHNICAL FIELD

The present invention relates to mechanical pipe joints and, in particular, to mechanical pipe joints including a gripping ring and a compressible gasket positioned between the pipe bell and the gland.

BACKGROUND OF THE INVENTION

Mechanical joints for securing bell and plain pipe end assemblies are well known in the art. One standard mechanical joint includes a compressible gasket slipped around the plain pipe end and positioned between the pipe bell and the gland. Tightening of included joint securing bolts forces the gland towards the pipe bell compressing the gasket in a conical cavity formed in the bell and securing the joint. The standard mechanical joint, however, ineffectively secures the bell and plain pipe end in instances where the pipe is internally exposed to varying hydraulic pressures. Such pressures tend to cause axial movement along the joint which may result in leaking around the gasket and/or releasing of the joint.

To address the deficiencies of the standard mechanical joint, the prior art further teaches the use of a toothed split ring slipped around the plain pipe end and positioned in a conical cavity formed in the gland. The tightening of securing bolts forces the gland towards the pipe bell compressing the gasket to seal the joint, with the conical cavity of the gland coaxially compressing the split ring such that the included teeth grip the plain pipe end to secure the joint. The gripping action of the toothed split ring secures the joint by resisting axial movement in the joint when the pipe is exposed to varying internal hydraulic pressures. However, over-tightening of the securing bolts and/or improper initial assembly alignment may cause the split ring to become overly-compressed during assembly resulting in a deformation of the plain pipe end and destruction of the joint. In fact, in some instances, the gland may be pulled completely over the split ring during incorrect or improper assembly.

SUMMARY OF THE INVENTION

The present invention is an improved mechanical pipe joint for use in a bell and plain pipe end assembly, comprising a gland encircling the plain pipe end having a conical cavity for receiving a toothed split ring, the ring having a complementary conically shaped outer surface. Tightening of the gland to the bell causes the split ring to coaxially compress within the conical cavity and grip the plain pipe end. The gland further includes an integrally formed, radially extending shelf positioned at a narrow end of the conical cavity for abutting against an end of the split ring. As the gland is tightened to the bell, the shelf acts as a mechanical stop to certain excessive movement of the gland with respect to the coaxially compressing split ring. The shelf thus minimizes the likelihood of an over-compression of the split ring resulting in possible deformation of the pipe and destruction of the joint. The joint is sealed during tightening by a compressible gasket positioned between the split ring and the bell and received in a conical cavity of the bell.

BRIEF DESCRIPTION OF THE DRAWINGS

A more complete understanding of the improved mechanical pipe joint of the present invention may be had by reference to the following Detailed Description when taken in conjunction with the accompanying Drawings wherein:

FIG. 2 is an assembled cross-sectional view of the components of the improved mechanical pipe joint shown in FIG. 1.

DETAILED DESCRIPTION OF THE PREFERRED EMBODIMENT

Figure 1:
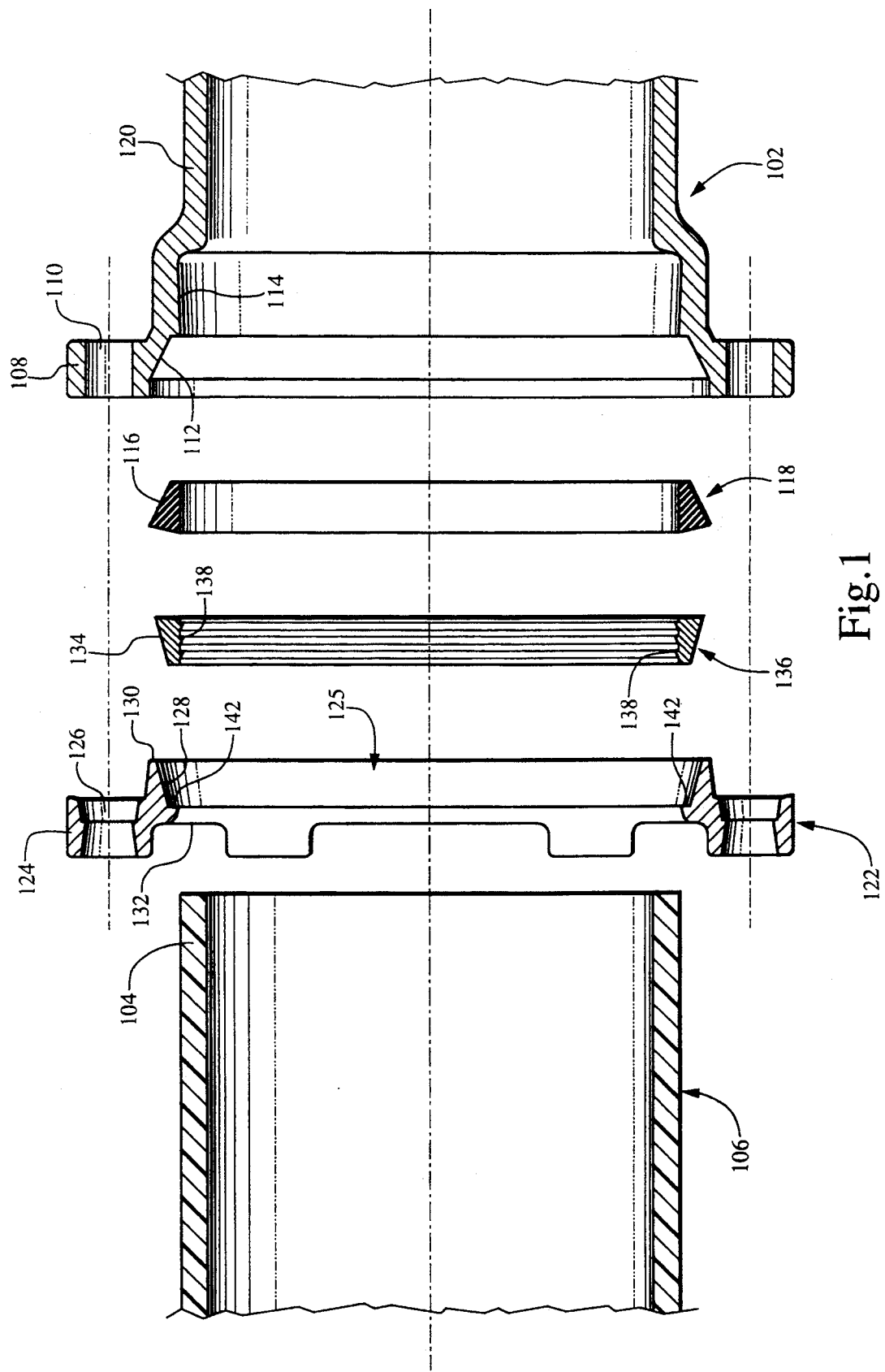
FIG. 1 is an exploded cross-sectional view of the improved mechanical pipe joint of the present invention.

Referring now to FIG. 1, there is shown an exploded cross-sectional view of the improved mechanical pipe joint of the present invention for securing a conventional bell 102 to the end 104 of a conventional plain pipe 106. The bell 102 includes a peripheral flange 108 having a plurality of apertures 110 for receiving standard securing bolts (not shown, see FIG. 2) in a manner to be described. The bell 102 further includes a conical cavity 112 narrowing in diameter from the peripheral flange 108 to a recess portion 114 connected to a bell pipe 120 having substantially the same diameter as the plain pipe 106. The conical cavity 112 of the bell 102 is shaped to complement the outer conically shaped surface 116 of a compressible gasket 118. The diameter of the bell 102 at the recess portion 114 is selected to receive the plain pipe end 104 in a manner to be described.

The mechanical joint further includes a gland 122 with a peripheral flange 124 having an opening 125 for encircling the plain pipe 106 and a plurality of peripheral apertures 126 equal in number and capable of alignment with the apertures 110 of the bell 102. The gland 122 further includes a conical cavity 128 associated with the opening 125 narrowing in diameter from a forward end 130 to a rearward end 132 of the gland. The conical cavity 128 of the gland 122 is shaped to complement the outer conically shaped surface 134 of a split ring 136. The split ring 136 includes a plurality of circumferential teeth 138 on an inner cylindrical surface thereof, and also includes a well known gap or split (not shown) for facilitating a coaxial compression of the split ring within the conical cavity 128 and gripping of the plain pipe end 104 with joint assembly. The gland 122 further includes a radially extending and integrally formed shelf 142 positioned adjacent the rearward end 132 for abutting against the narrow end of the split ring 136 when the split ring is seated in the conical cavity 128.

With reference now to FIGS. 1 and 2, assembly of the joint of the present invention will be described. The gland 122 is first slipped onto the end 104 of the plain pipe 106 with the forward end 130 of the gland facing the plain pipe end. The split ring 136 is then slipped onto the plain pipe end 104 with its narrow end facing the gland 122 for subsequent insertion into the conical cavity 128. The compressible gasket 118 is then slipped onto the plain pipe 106 and positioned a predetermined distance away from the plain pipe end 104. The pipe 106 is then inserted into the recess portion 114 of the bell 102 with the conical cavity 112 of the bell 102 receiving the positioned gasket 118. The split ring 136 is then pushed against the gasket 118 and the gland 122 is pushed against the split ring such that the ring is received in the conical cavity 128. Standard securing bolts 140 are then inserted through the aligned apertures 110 and 126 of the bell 102 and gland 122, respectively, and tightened to draw the gland toward the bell. As the joint is tightened, the split ring 136 is coaxially compressed within the conical cavity 128 of the gland 122, with the circumferential teeth 138 engaging the outer surface of the plain pipe 106 to resist subsequent axial pipe movement. In this connection, the radial shelf 142 abuts against the split ring 136 and functions as a mechanically stop to certain excessive movement of the gland 122 with respect to the split ring. In particular, the shelf 142 resists the excessive movement of the gland 122 over the split ring 136 which is likely to cause over-compression of the split ring. The shelf 142 thus functions to save the plain pipe end 104 from deformation and the joint from destruction resulting from ring 136 over-compression. Furthermore, the radial shelf 142 abuts against the narrow end of the split ring 136 pushing the split ring against the gasket 118, and compressing the gasket into the conical cavity 112 of the bell 102 to seal the joint. At the same time, the forward end 130 of the gland 122 is placed in contact with and compresses the gasket 118 to further seal the joint.

Although a preferred embodiment of the improved mechanical joint of the present invention has been illustrated in the accompanying Drawings and described in the foregoing Detailed Description, it will be understood that the invention is not limited to the embodiment disclosed, but may be modified without departing from the spirit of the invention as set forth and defined by the following claims.

We claim:

1. A mechanical joint for use in a bell and plain pipe end assembly, comprising:
   a plain pipe end;
   a gasket encircling the plain pipe end;
   a bell including a peripheral flange and an opening for receiving the plain pipe end, said opening further defining a cavity for seating the gasket;
   a split ring with a conical external surface; and
   a gland including a peripheral flange and an opening for encircling the plain pipe end, said opening further having a conical shape complementing the conical external surface of the split ring and defining a conical cavity for seating a front edge of the split ring in a position abutting against the gasket, said conical cavity tapering from a front end also abutting against the gasket to a rear end, said gland further including an integrally formed, radially extending shelf positioned at the rear end of the gland for abutting against a rear edge of the split ring seated in the conical cavity when the front end of the gland abuts against the gasket.

2. A mechanical joint for use in a bell and plain pipe end assembly, comprising:
   a plain pipe end;
   a gasket encircling the plain pipe end and having a conical external surface;
   a bell including a peripheral flange and an opening for receiving the plain pipe end, said opening further having a conical shape complementing the conical external surface of the gasket and defining a conical cavity for seating the gasket;
   a split ring encircling the plain pipe end and having a conical external surface;
   a gland including a peripheral flange and an opening for encircling the plain pipe end, said opening further having a conical shape complementing the conical external surface of the split ring and defining a conical cavity for seating the split ring, said conical cavity tapering from a front end to a rear end, said gland further including an integrally formed, radially extending shelf positioned at the rear end of the gland for preventing the split ring from becoming over-compressed during tightening of the mechanical joint; and
   wherein, when the mechanical joint is assembled and tightened, a front edge of the split ring is positioned abutting against the gasket, the front end of the gland is positioned also abutting against the gasket, and the integrally formed, radially extending shelf is positioned abutting against a rear edge of the split ring.

* * * * *